G. L. & F. L. GRIER.
PROCESS OF MATCHING TOOTH CEMENT.
APPLICATION FILED JAN. 21, 1913.
1,191,692.
Patented July 18, 1916.
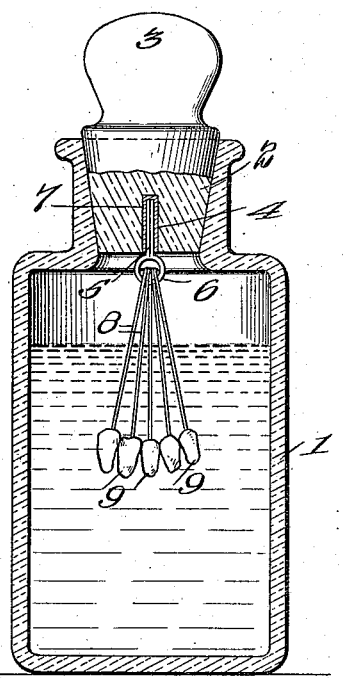
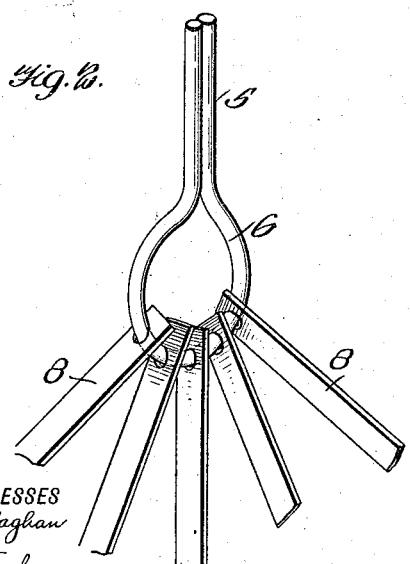
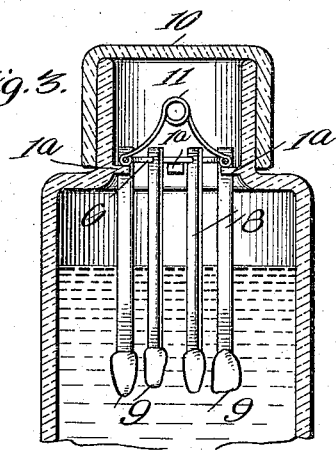

UNITED STATES PATENT OFFICE.

GARRETT L. GRIER AND FRANK L. GRIER, OF MILFORD, DELAWARE.

PROCESS OF MATCHING TOOTH-CEMENT.

1,191,692. Specification of Letters Patent. Patented July 18, 1916.

Application filed January 21, 1913. Serial No. 743,333.

*To all whom it may concern:*

Be it known that we, GARRETT L. GRIER and FRANK L. GRIER, citizens of the United States, and residents of Milford, in the county of Kent and State of Deleware, have made certain new and useful Improvements in Processes of Matching Tooth-Cement, of which the following is a specification.

Our invention relates to improvements in processes of matching tooth cement, and it consists in the steps hereinafter described and claimed.

An object of our invention is to provide a process for matching cement that is to be used as a filling for a tooth, with the tooth itself, so that after the cement is inserted it is very difficult, if not impossible, to distinguish the cement from the tooth itself.

Our invention is illustrated in the accompanying drawings forming part of this application in which—

Figure 1 is a vertical section through a holder for the cement shade guides, Fig. 2 is an enlarged perspective view of a suspending ring and a portion of the strips, and Fig. 3 is a sectional view of a modified form of the device.

In carrying out our invention we provide a bottle or other similar receptacle 1 of the shape shown in Fig. 1. This bottle is provided with a stopper 2 of the same material, and having a handle or knob 3. The underside of the stopper is provided with a bore 4 arranged to receive the stem 5 of a ring 6. In the drawings we have shown the stem 5 as consisting of the adjacent ends of the ring 6 although it may be a single integral stem without departing from the spirit of the invention. This stem is held in the bore 4 by means of cement 7.

Suspended from the ring 6 are a series of strips 8 which are slidable on the ring and also have a pivotal movement with respect thereto. These strips are preferably of a thin resilient waterproof material, such as celluloid, or the like, and bear at their lower end the shade guides 9. The latter are really pieces of cement of various tints or shades, each formed in the shape of a tooth. As will be seen from the drawing, the lower ends of the strips 8 with the cement samples are submerged beneath the water.

From the foregoing description of the various parts of the device the operation thereof may be readily understood.

In filling a tooth with cement it is often difficult to attain the right color. The cement is put up in the form of powder and is mixed with phosphoric acid into a paste, and one is very liable to get the cement filling either darker or lighter than the tooth itself. With our process, however, this liability of error is reduced to a minimum. The cement shades or samples are already made up and are kept submerged under water in the bottle 1. When it is necessary to determine the shade of cement to be used the stopper 3 is removed and held in the palm of the hand, while the strips 8 are separated with the fingers, and the cement samples or shade guides in their moist condition may be placed along side of the tooth to be treated. Unless the cement is moistened it will not be of the shade that it has when placed in the cavity of a tooth, for when the cement is dry it will appear generally of a lighter shade. The shade guides are numbered to correspond with the powders from which they are made, so that the proper shades can be readily ascertained. As soon as the selection is made, the stopper is returned to its place, the shade guides again being submerged in the water where they are kept free from contamination and ready for instant use.

It will be seen that the placing of the shade guides under water serves a double purpose. It keeps them in a moistened condition so that they do not have to be moistened when they are removed from the bottle, besides keeping them in a perfectly sanitary state. The stopper 2 serves, as stated, as a handle for manipulating the shade guides with the fingers and also as a means of suspension for the shade guides when the latter are submerged in the water.

In Fig. 3 we have shown a modified form of the device in which the bottle 1 is provided with a cap 10. The neck of the bottle is provided on the interior with inwardly projecting lugs 1ª. The ring 6 which supports the strips 8 bearing the shade guides 9 is adapted to rest on the lugs 1ª and a handle 11 is provided for lifting the shade guides out of the bottle when they may be used as already described.

We are aware that shade guides having different tints have been used for matching artificial teeth, but so far as we know, no one has prepared a series of cement samples having different tints which are designed to be wet so as to change the tint and then to match the sample, when wet, with the tooth.

Obviously, other liquids beside water might be used to change the tints before matching without departing from the spirit and scope of the invention.

We claim:—

1. The herein described process of matching cement with teeth which consists in preparing a series of cement shade guides of different tints, subsequently altering the tints by immersing them in a liquid, and then matching the teeth with the cement samples.

2. The herein described process of matching cement samples with teeth which consists in preparing a series of cement shade guides of different tints, subsequently altering the tints by immersing them in water, and then matching the teeth with the cement samples.

3. The herein described process of matching cement samples with teeth which consists in preparing a series of cement shade guides of different tints, and subsequently altering the tints by immersing them in water and then matching the teeth with the wet cement samples.

GARRETT L. GRIER.
FRANK L. GRIER.

Witnesses:
WILLIAM C. SMITH,
WALTER L. GRIER.

Copies of this patent may be obtained for five cents each, by addressing the "Commissioner of Patents, Washington, D. C."